GUARD MEMBER FOR PHONOGRAPH RECORD RACK

Filed July 19, 1968 3 Sheets-Sheet 1

INVENTORS
JOHN V. KNIGHT
KENNETH T. McGOWAN
RICHARD J. McGOWAN
BY
Raford Gregory
ATTORNEYS

GUARD MEMBER FOR PHONOGRAPH RECORD RACK

Filed July 19, 1968 3 Sheets-Sheet 2

INVENTORS
JOHN V. KNIGHT
KENNETH T. Mc GOWAN
BY RICHARD J. Mc GOWAN

ATTORNEYS

Feb. 24, 1970 J. V. KNIGHT ET AL 3,497,075

GUARD MEMBER FOR PHONOGRAPH RECORD RACK

Filed July 19, 1968 3 Sheets-Sheet 3

INVENTORS
JOHN V. KNIGHT
KENNETH T. McGOWAN
BY RICHARD J McGOWAN

Reifand Gregory
ATTORNEYS

3,497,075
GUARD MEMBER FOR PHONOGRAPH RECORD RACK

John V. Knight, 3201 St. Margaret Drive 55422; Kenneth T. McGowan, 8825 Elgin Place 55427; and Richard J. McGowan, 2655 Scott Ave. 55422, all of Minneapolis, Minn.

Filed July 19, 1968, Ser. No. 746,073
Int. Cl. A47g 29/00
U.S. Cl. 211—40 4 Claims

ABSTRACT OF THE DISCLOSURE

A spaced pair of guard members in connection with a rack of phonograph records to overlie the transverse partitions of said rack forming bins therein, said guard members each comprising an elongated plate member having depending stiffening rib portions, said plate members being supported by said partitions and being of a width to overlie the adjacent end portions of phonograph records to prevent the removal of said records therebetween, said plate members having aligned pairs of slots having facing open ends of a width and depth to permit the removal of a record therebetween and said slots being spaced along said plate members at desired intervals.

BACKGROUND AND SUMMARY OF THE INVENTION

Phonograph records are generally displayed in quantity in tiered racks, each tier of said racks being partitioned into compartments or bins of a width to accommodate a phonograph record.

Theft of records is common and is a source of substantial loss to a record dealer. Theft generally is accomplished by a person seizing a handful of records from a bin and swiftly concealing the same underneath an outer garment. It is not uncommon for a receptacle for the records to be carried under and secured to the outer garment. The time interval for the theft must be a short one to avoid detection. Means which would limit the simultaneous removal of records to a small number, such as one or two, and which would lengthen the time of removal of records from a rack, would serve as an effective deterrent to theft.

It is desirable therefore to provide means which would restrict or limit the withdrawal of records from a display rack without obstructing a full view of the records and without interfering with the inspection of individual records within a bin of the rack.

In view of the premises above set forth, generally described, the invention herein comprises a pair of elongated preferably transparent plate-like members made as of suitable plastic material, said members comprising portions overlying adjacent transverse partitions of the rack and having terminal portions secured to said partitions or rack, said members having a width extending inwardly of said partitions to prevent the removal of records therebetween but which permit the free inspection and selection of records therein as by a tilting of the records. Said plate members have aligned pairs of slots, said slots have a width and depth such as to permit the removal of only a small number of records at one time, such as one or two records. Said pairs of slots will be spaced at desirable intervals along said plate members.

It is an object of this invention therefore to provide means which would permit an unobstructed display and free selection of records in a record display rack but which would restrict the removal of records therefrom.

It is another object of this invention to provide a simply constructed and simply installed means to give protection against the theft of records by the removal of a large number of records, such as a handful, at one time.

It is also an object of this invention to provide means which would tend to prevent any swift withdrawal of a record from a phonograph record display rack.

These and other objects and advantages of the invention will be set forth in the following description made in connection with the accompanying drawings in which like reference characters refer to similar parts throughout the several views and in which.

DESCRIPTION OF A PREFERRED EMBODIMENT

Figure 1:
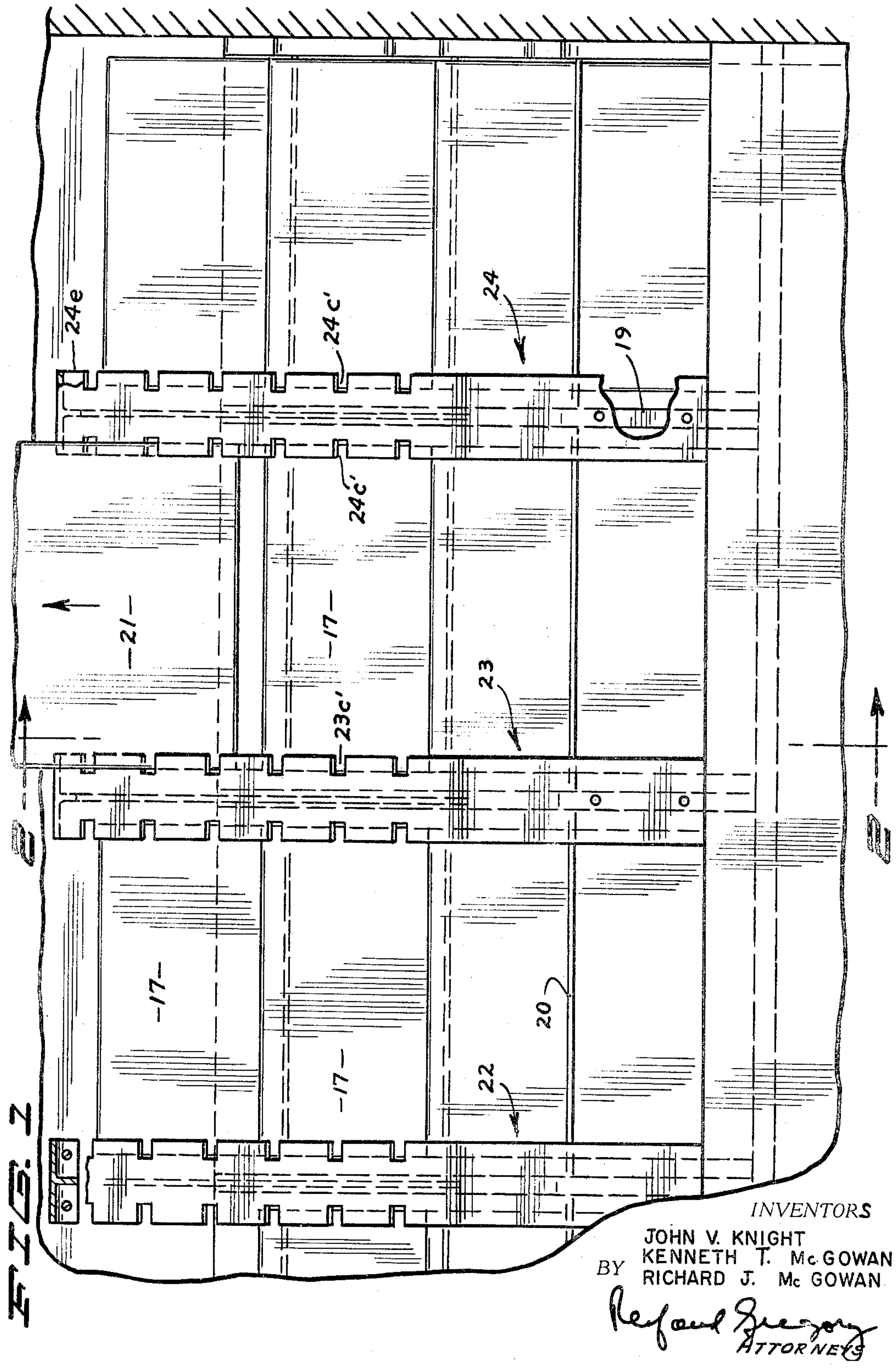
FIG. 1 is a broken view in front elevation taken on line 1—1 of FIG. 2 as indicated.
Figure 2:
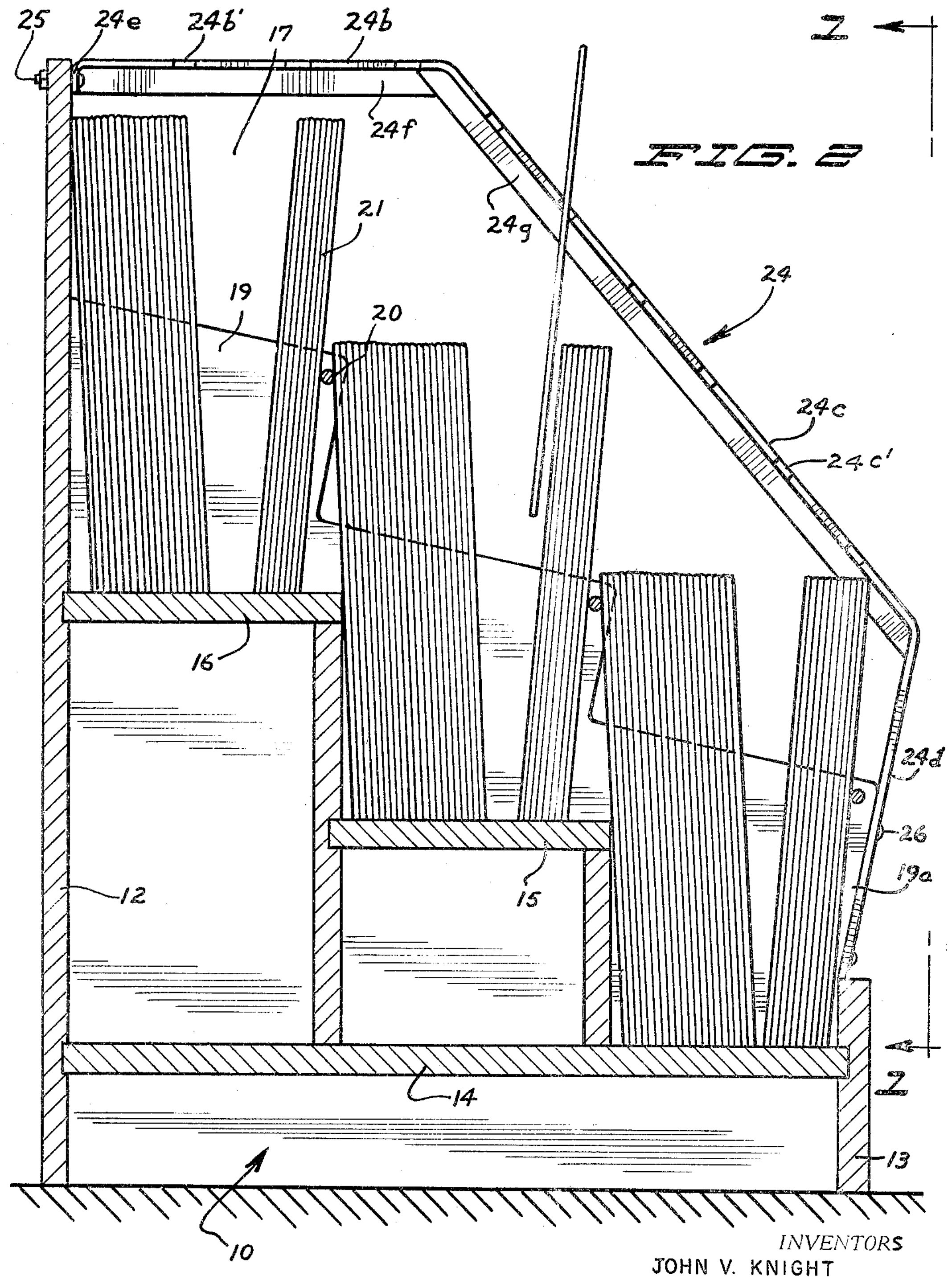
FIG. 2 is a broken view in vertical cross section taken on line 2—2 of FIG. 1 as indicated, with a portion thereof being shown in side elevation.

With reference to FIGS. 1 and 2, a conventional tiered phonograph record rack 10 is shown just sufficiently to support a full disclosure of the invention herein and is indicated having a back wall 12 and a relatively low front wall 13. End walls are not shown but extending therebetween from front to back is a raised base member 14 having stepped risers 15 and 16 thereabove forming the tiered structure. Dividing said rack laterally into compartments or bins 17 are stepped partitions or dividing walls 19 supported on said risers and are shown here having laterally disposed rods 20 extending across the rack through front wall portions thereof with respect to each tier as shown to form forward retaining rods for the records 21 disposed in said bins. Said bins will be of a width to accommodate said records and each tier or step of said rack will provide sufficient depth to the bins to accommodate a substantial number of records. The forward end walls of said partitions will extend or be inclined forwardly of the lowest tier of bins as indicated.

The above rack as described makes the records readily accessible and they will be tilted forwardly in each bin for individual inspection. Said records as above displayed, being unobstructed from above may be quickly removed such as a handful at a time.

The purpose of the invention herein is to restrict the removal of said records from said rack in such a manner as not to adversely affect the display or sale of said records but to discourage the theft of said records.

In view of the above premises, the invention herein comprises a plurality of elongated slotted plate members which extend the full height of the rack and of which 22–24 indicate a representative number and said members have a cooperative relationship in pairs. Only said plate member 24 will be describe in detail.

Said plate member 24 may be formed of various suitable materials and desirably is formed of a suitable transparent plastic material. Said plate member as here shown comprises a horizontal upper portion **24*b* to extend over the top tier of records and an inclined portion 24*c* extending over the remainder of the tiers of records and terminating in a depending somewhat inwardly angled leg portion 24*d*. Said portion 24*b* has a depending flange 24*e* at its end which by a bolt 25 is secured to said back wall 12. The depending leg portion 24*d* is secured by appropriate screws 26 to the end wall 19*a* of the lowest step portion of the partition 19**.

Said plate member will have a width to overlie adjacent bins a sufficient distance to extend over the adjacent end portion of the records therein whereby said plate member in overlying the edge of a bin will obstruct the removal of a record therefrom.

Depending centrally of said portions 24*b* and 24*c* of said plate member in vertical alignment with the partition 19 are depending stiffening rib portions 24*f* and 24*g*.

Said plate member will be mounted over each partition member including the end walls of the rack which will form the end partitions but which are not here shown.

Formed within said plate portions 24*b* and 24*c* at either side thereof and extending inwardly thereof short of the center lines thereof are open-ended slots 24*b'* and 24*c'* here shown to be in alignment with one another.

The plate member 23 will have corresponding slots such as 23*c'*. The slots will be spaced in accordance with the depth of the bins to permit the ready removal of one or two records at a time and preferably one record. As illustrated, more than one pair of slots will be vertically aligned with each bin.

Said slots will have a depth such that a pair of laterally aligned slots, such as slots 24*c'* and 23*c'* will accommodate the passage of a record therebetween, as shown in FIG. 1.

The end walls of the rack, though not here shown, may be of sufficient height to require that records to be removed must be lifted upwardly and through the slots of the plate member extending over the inner side wall portions of the end bins making a plate member unnecessary to overlie the end walls, if such be desired.

Thus the use of this invention as indicated by the plate member 22–24 in connection with a record rack makes difficult the removal of more than one or two records at a time and makes the removal of a record sufficiently slow as to substantially discourage theft of records protected as indicated.

MODIFICATION

Figures 3, 4:
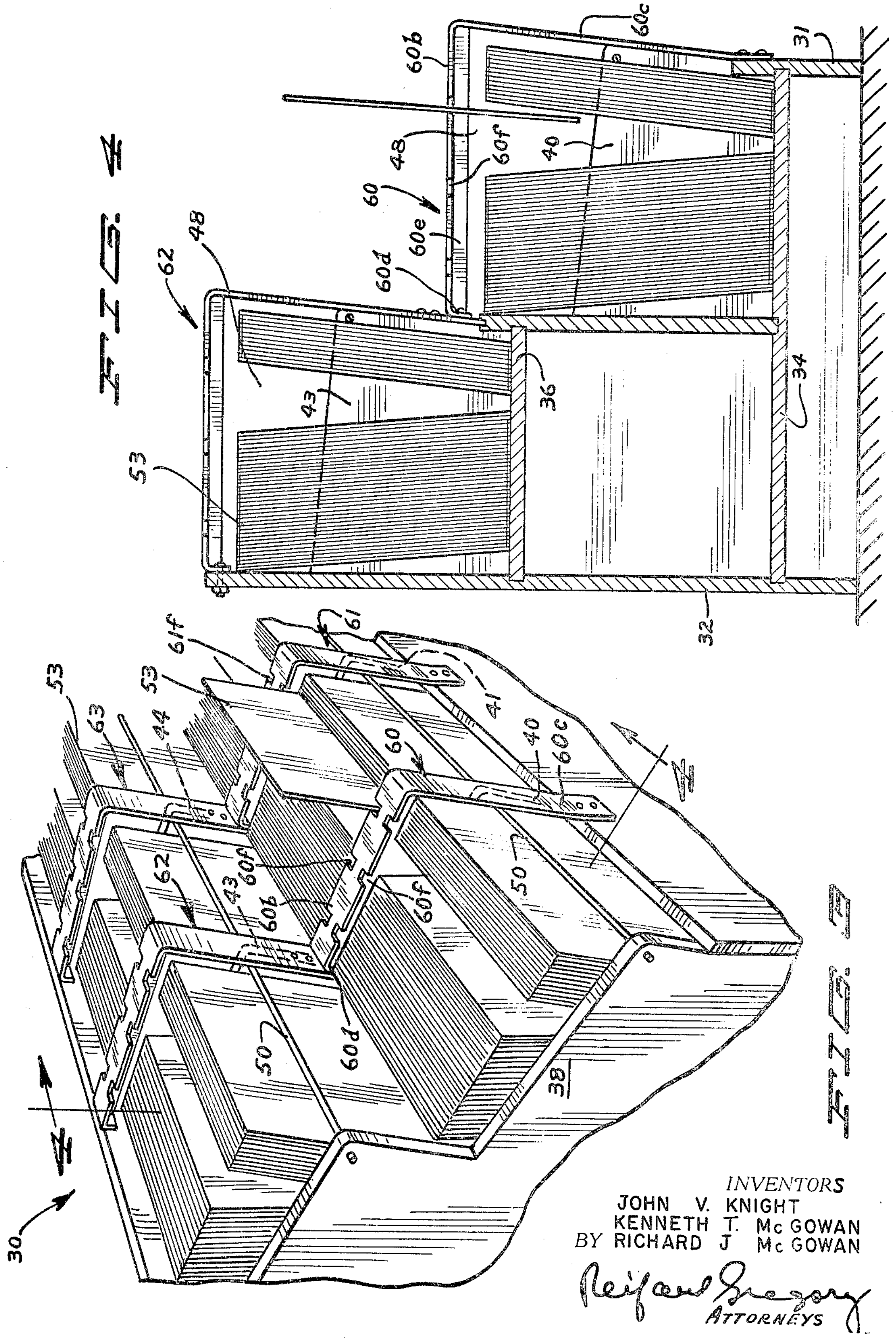
FIG. 3 is a broken view in perspective showing a modification of the invention herein.
FIG. 4 is a view in vertical cross section taken on line 4—4 of FIG. 3 as indicated.

A modification of the invention above described is shown in FIGS. 3 and 4.

A tiered or stepped record rack 30 is illustrated with just sufficient structure being shown to support a disclosure of the invention herein.

Indicated with respect to said rack 30 are front and rear walls 31 and 32 having a raised base member 34 extending therebetween the length of the rack to form the bottom of one tier of bins. A stepped riser 36 forms the second tier of bins. The end walls will be stepped with just one end wall 38 being here shown. Spaced between the end walls are partitions 40 and 41 for the lower tier and 43 and 44 for the upper tier. Said partitions therebetween and with respect to the end walls form bins which are indicated generally by the reference numeral 48.

Rods 50 extend across the front of each tier of bins through accommodating apertures of the forward portions of said partitions and corresponding portions of the end walls. Said rods in lieu of front walls form retaining members for the records in said bins. Disposed within said bins are phonograph records 53.

Protective guard plate members 60–63 are shown in connection with the rack 30 and these plate members represent some modification in configuration in comparison to the plate members 22–24 above described. The plate members 22–24 were of sufficient length to extend the full height of a tiered rack for records. The plate members 60–63 are of shorter length, being arranged and constructed to be applied to the bins at each tier of the rack. Hence the plate member 60 as here shown comprises a horizontal portion 60*b* and a depending leg portion 60*c*. Said portion 60*b* has a depending flange 60*d* at its free end to be secured by suitable screws to the leading edge portion of the partition of the adjacent tier of bins or of the back wall as the case may be. The depending leg portion will be secured to the front wall or to the leading edge of a partition as the case may be. Depending from said portion 60*b* is a depending stiffening rib 60*e* and formed in said horizontal portion are opposed pairs of slots as represented by slots 60*f* and having open ends at either side of said portion. The members 61–63 have corresponding slots such as slot 61*f*. Thus with reference to the member 60 and 61 as illustrated in FIG. 3, an aligned pair of facing slots of said adjacent plate members will have sufficient depth to accommodate the passage of a record therebetween. The slots may be of a width to permit more than one record to be withdrawn at one time depending upon how restrictive it may be desired to have the slots. There will be a sufficient number of slots to suitably accommodate removal of records from each bin.

What is claimed is:

1. A guard member for phonograph record racks having partition members forming bins to contain records, comprising
   - an elongated plate member, means supporting said plate member over a partition member at one side of a bin,
   - said plate member having a width to extend sufficiently to one side of said partition member into the adjacent bin to overlie the adjacent end portions of records therein and to obstruct the removal of said records,
   - said plate member having lateral open-ended slots therein spaced therealong with respect to said bins,
   - said slots having a depth to permit the passage of a record therethrough, and
   - said slots having a width such as to restrict the number of records passing therethrough at one time.
2. The structure set forth in claim 1, including
   - a second elongated plate member supported on a partition member at the other side of said bin,
   - said second plate member having open-ended slots therein in alignment with said slots in said first mentioned plate member, and
   - said aligned slots having sufficient depth taken together to accommodate the passage of a record therebetween.
3. The structure set forth in claim 1, wherein
   - said plate member has a portion coextensive with the bins of said rack, said portion having an underlying stiffening rib and having portions at either end thereof engaged by said supporting means.
4. The structure set forth in claim 1,
   - said plate member supporting means elevating said plate member a sufficient distance above said bins for free tilting movement of said records for inspection of said records.

References Cited

UNITED STATES PATENTS

| | | | |
|---|---|---|---|
| 863,961 | 8/1907 | Alexander | 211—40 |
| 1,381,525 | 6/1921 | Wagoner et al. | 211—40 |
| 3,391,792 | 7/1968 | Makar | 211—40 |

JAMES A. LEPPINK, Primary Examiner.